United States Patent [19]

Miyata et al.

[11] Patent Number: 5,707,919
[45] Date of Patent: Jan. 13, 1998

[54] CATALYST FOR PREPARING CHLORINE FROM HYDROGEN CHLORIDE

[75] Inventors: Katsuharu Miyata, Fukuoka-ken; Jyoji Morisaki, Kumamoto-ken; Teruo Hirayama, Fukuoka-ken; Hironori Kamachi, Kumamoto-ken; Kunihiro Yamada, Fukuoka-ken, all of Japan

[73] Assignee: Mitsui Toatsu Chemicals, Inc., Tokyo, Japan

[21] Appl. No.: 552,775

[22] Filed: Nov. 3, 1995

[30] Foreign Application Priority Data

| Nov. 14, 1994 | [JP] | Japan | 6-278804 |
| Aug. 31, 1995 | [JP] | Japan | 7-223090 |
| Sep. 6, 1995 | [JP] | Japan | 7-228749 |

[51] Int. Cl.$^6$ ............... B01J 23/26; B01J 23/04; B01J 23/72; C01B 7/04
[52] U.S. Cl. ............... 502/319; 502/344; 502/345; 423/502; 423/507
[58] Field of Search ............... 502/319, 302, 502/303, 344, 345, 232, 244, 256; 423/502, 507

[56] References Cited

U.S. PATENT DOCUMENTS

| 4,828,815 | 5/1989 | Kiyoura et al. | 423/502 |
| 5,093,292 | 3/1992 | Yoshikawa et al. | 502/25 |
| 5,112,593 | 5/1992 | Itoh et al. | 423/502 |

FOREIGN PATENT DOCUMENTS

| 0184413 | 6/1986 | European Pat. Off. . |
| 0272332 | 6/1988 | European Pat. Off. . |
| 0432909 | 6/1991 | European Pat. Off. . |
| 946830 | 8/1960 | United Kingdom . |
| 946830 | 1/1964 | United Kingdom . |

*Primary Examiner*—Glenn Caldarola
*Assistant Examiner*—Alexander G. Ghyka
*Attorney, Agent, or Firm*—Burns, Doane, Swecker & Mathis

[57] ABSTRACT

A method for preparing an improved catalyst for use in the preparation of chlorine by the oxidization of hydrogen chloride with an oxygen-containing gas. The catalyst mainly comprises chromium oxide and can be used for a long period of time particularly under low oxygen content conditions, and the activity of the catalyst does not easily deteriorate, and in other words, the catalyst has a long life. Furthermore, there are disclosed the catalyst obtained by this preparation method, and a method for preparing chlorine from hydrogen chloride by the use of the catalyst. The method for preparing the improved catalyst comprises adding copper, an alkali metal and a rare earth metal, or adding chromium, copper, an alkali metal and a rare earth metal to a catalyst containing chromium oxide as a main component, and then calcining the catalyst at a temperature of 800° C. or less.

10 Claims, No Drawings

CATALYST FOR PREPARING CHLORINE FROM HYDROGEN CHLORIDE

BACKGROUND OF THE INVENTION (i) Field of the Invention

The present invention relates to an improved catalyst for use in the preparation of chlorine by the catalytic oxidation of hydrogen chloride, a process for preparing the improved catalyst, and a process for preparing chlorine from hydrogen chloride by the use of the improved catalyst.

(ii) Description of the Prior Art

Chlorine has been manufactured on a large scale by the electrolysis of sodium chloride, but it has been difficult to regulate the demand and supply balance between chlorine and caustic soda which is formed together with chlorine. On the other hand, hydrogen chloride is secondarily produced in large quantities by a chlorinating reaction of an organic compound or at the time of a reaction with phosgene, but the amount of the secondarily produced chloride is much larger than its demand, and thus a large amount of hydrogen chloride has been discarded in vain at a great treatment cost.

Therefore, if chlorine can be obtained from hydrogen chloride with a high efficiency, the demand of chlorine can be met without giving rise to the demand and supply unbalance between chlorine and caustic soda.

It has been suggested to use chromium oxide as an oxidation catalyst for hydrogen chloride, but there has not been reported results that this kind of catalyst can exert such a sufficient performance as to withstand an industrial use.

For example, a method has been suggested which comprises causing hydrogen chloride to flow at about 400° C. on a catalyst prepared by impregnating a suitable carrier with anhydrous chromic acid or an aqueous chromium nitrate and then carrying out thermal decomposition, stopping the feed of hydrogen chloride after the deactivation of the catalyst, introducing air so as to recover the catalyst activity, and then stopping the feed of air and feeding hydrogen chloride again (British Patent No. 584,790).

Furthermore, another technique has been disclosed in which hydrogen chloride is reacted with oxygen contained therein at a reaction temperature of 420° to 430° C. at a space velocity of 380 $hr^{-1}$ by the use of a catalyst prepared by supporting a dichromate or dark green chromium oxide onto a carrier, and a hydrogen chloride conversion of 67.4% on the average is obtained (British Patent No. 676,667). In this case, the conversion at a space velocity of 680 $hr^{-1}$ is 63%. The reaction is observed even at 340° C., but in this case, the conversion is as low as 52% at a low space velocity of 65 $hr^{-1}$. Thus, these methods are unsuitable for industrial practice because of the high reaction temperature and the low space velocity.

On the other hand, it has been found that a chromium oxide catalyst which can be obtained by calcining, at a temperature of 800° C. or less, a compound formed by reacting an aqueous solution of chromic acid with ammonia exerts a high activity in the oxidation reaction of hydrogen chloride (Japanese Patent Application Laid-open No. 275104/1986), and by the use of this catalyst, chlorine can be manufactured at a lower temperature and a higher space velocity than by conventional catalysts.

However, the above-mentioned catalyst has a problem that when it is used in the oxidation reaction of the hydrogen chloride gas, the activity of the catalyst deteriorates after several months from the start of the reaction, and another problem is that the amount of oxygen for the oxidation is required to be 2.5 to 3 times as much as a theoretical amount (excess ratio=150 to 200%) in order to maintain the high conversion. As a technique of activating the deteriorated catalyst, there has been suggested a method which comprises bringing the catalyst into contact with the hydrogen chloride gas and/or an oxygen-containing gas in a high-temperature gaseous phase (Japanese Patent Application Laid-open No. 254846/1987). However, if the catalyst activated by this method is used in the oxidation reaction of the hydrogen chloride gas, the catalyst can maintain the activity equal to that of the fresh catalyst for several days from the start of the reaction, but after one week or more, the activity begins to deteriorate, so that the activated catalyst inconveniently cannot withstand long-term use.

Moreover, another activation method has been suggested which comprises impregnating the catalyst with an aqueous solution of a chromium salt or chromium oxide, and then calcining it at a temperature of 800° C. or less (Japanese Patent Application Laid-open No. 221145/1991). However, when the catalyst activated by this method is used in the oxidation reaction of the hydrogen chloride gas, the catalyst can also maintain the activity equal to that of the fresh catalyst for several days from the start of the reaction, but after one month or more, the activity begins to deteriorate. Thus, the activated catalyst has a problem that it cannot withstand a long-term use.

A method for preparing chlorine by the oxidation of hydrogen chloride with a copper-containing catalyst is known as the Deacon reaction from former days, and with regard to the copper-containing catalysts invented in 1868 by Deacon, there have afterward been suggested many kinds of catalysts containing copper chloride, potassium chloride and a third component selected from various compounds. However, for the industrial use of any of these catalysts, a reaction temperature must be heightened to obtain a sufficient reaction rate, but the rise of the reaction temperature brings about the volatilization of the catalytic components, so that the activity of the catalyst deteriorates in a short period of time. In short, this kind of catalyst has a fatal problem regarding catalyst life. In addition, it is also known that the rise of the reaction temperature coagulates the catalyst, and particularly when the catalyst is used as a fluidized bed catalyst, there is a serious problem that fluidization is inhibited, so that the catalyst does not function any more.

SUMMARY OF THE INVENTION

The present invention has been intended to solve the problems of the above-mentioned conventional known catalysts in manufacturing chlorine by the oxidation of hydrogen chloride, and an object of the present invention is to provide an improved catalyst containing chromium oxide as a main component which can be used for a long period of time under conditions of low oxygen concentration and can sufficiently suppress the deterioration of its activity.

Another object of the present invention is to provide a method for preparing the above-mentioned catalyst.

Still another object of the present invention is to provide a method for preparing chlorine from hydrogen chloride by the use of the above-mentioned catalyst.

With the intention of achieving the objects of the present invention, the present inventors have intensively investigated a preparation method of an improved high-active and long-life catalyst containing chromium oxide for use in the preparation of chlorine by the oxidation of hydrogen chloride.

As a result, it has been found that a catalyst which can be obtained by adding copper, an alkali metal and a rare earth metal, or adding chromium, copper, an alkali metal and a rare earth metal to a catalyst material containing chromium oxide as a main component is suitable for the preparation of chlorine by oxidizing hydrogen chloride with an oxygen-containing gas, and this catalyst is more highly active as compared with conventional catalysts containing chromium oxide as a main component, and the activity of the catalyst scarcely deteriorates with time, in other words, it has a long life, and its activity can be effectively maintained under conditions of low oxygen concentration. In addition, it has also been found that this catalyst does not give rise to problems such as the volatilization of catalytic components and the coagulation of the catalyst during reaction which the conventional copper-based Deacon catalysts have, so that the catalyst can withstand an industrial use for a long time.

Furthermore, a reactivation method of a chromium oxide catalyst has been found which comprises adding copper, an alkali metal and a rare earth metal, or adding chromium, copper, an alkali metal and a rare earth metal to a conventional catalyst containing chromium oxide as a main component and having a deteriorated activity which has been used in a reaction for preparing chlorine from hydrogen chloride. According to this reactivation method, the chromium oxide catalyst having the deteriorated activity can be activated, i.e., reactivated, and the thus reactivated catalyst can withstand an industrial use for a long time without bringing about the above-mentioned problems which a reactivation method of the conventional chromium oxide catalyst have. In consequence, the present invention has been completed on the basis of these knowledges.

That is to say, the present invention has the following constitutions.

(1) An improved catalyst for the preparation of chlorine by oxidizing hydrogen chloride with an oxygen-containing gas which is obtained by adding copper, an alkali metal and a rare earth metal, or adding chromium, copper, an alkali metal and a rare earth metal to a conventional catalyst containing chromium oxide as a main component.

(2) The catalyst according to (1) wherein the catalyst containing chromium oxide as the main component is a catalyst obtained by calcining, at a temperature of 800° C. or less, a mixture comprising a silicon compound and a reaction product of a chromium salt and ammonia or a compound capable of releasing ammonia.

(3) The catalyst according to (1) wherein the catalyst containing chromium oxide as the main component is a spent catalyst having a deteriorated activity which has already been used as the catalyst for the preparation of chlorine by oxidizing hydrogen chloride.

(4) The catalyst according to (1) wherein the alkali metal is potassium.

(5) The catalyst according to (1) wherein the rare earth metal is lanthanum.

(6) The catalyst according to (1) wherein copper, potassium and lanthanum are present in atomic ratios of 0.01 to 0.3, 0.005 to 0.2 and 0.01 to 0.3, respectively, with respect to chromium in the catalyst containing chromium oxide as the main component.

(7) The catalyst according to (2) wherein after the calcination, silicon compound is present in the form of silicon dioxide, and a weight ratio of chromium oxide to silicon dioxide is in the range of 5/95 to 95/5.

(8) A method for preparing a catalyst for the preparation of chlorine from hydrogen chloride by oxidizing hydrogen chloride with an oxygen-containing gas which comprises a step of impregnating a catalyst containing chromium oxide as a main component with a solution containing copper, an alkali metal and a rare earth metal, or a solution containing chromium, copper, an alkali metal and a rare earth metal, and a step of calcining the impregnated catalyst at a temperature of 800° C. or less.

(9) The method for preparing a catalyst according to (8) wherein the catalyst containing chromium oxide as the main component is impregnated with 0.2 to 2 ml of the solution for the impregnation with respect to 1 g of the catalyst containing chromium oxide as the main component.

(10). A method for preparing chlorine by oxidizing hydrogen chloride with an oxygen-containing gas which comprises the step of using a catalyst obtained by adding copper, an alkali metal and a rare earth metal, or adding chromium, copper, an alkali metal and a rare earth metal to a catalyst containing chromium oxide as a main component.

(11) The method for preparing chlorine according to (10) wherein hydrogen chloride is reacted with oxygen in an oxygen-containing gas, a molar ratio of oxygen being in the range of ¼ to 1 with respect to 1 mol of hydrogen chloride.

DETAILED DESCRIPTION OF THE INVENTION

A catalyst containing chromium oxide as a main component which can be used as a base catalyst for the present invention can take various conformations as described above and can be prepared by the above-mentioned method, but for example, the catalyst can be prepared by calcining, at a temperature of 800° C. or less, a mixture comprising a silicon compound and a reaction product of a chromium salt such as chromium nitrate, chromium chloride or a chromium salt of an organic acid and ammonia or a compound such as urea capable of releasing ammonia. No particular restriction is put on the mixing ratio of chromium and silica, but a weight ratio of $Cr_2O_3$ to $SiO_2$ which are conformations in the case that the catalyst has been finally calcined, i.e., $Cr_2O_3/SiO_2$ is often in the range of 5/95 to 95/5.

In the present invention, as a technique of adding the components of chromium, copper, the alkali metal and the rare earth metal to the catalyst containing chromium oxide as the main component, there can be employed a conventional catalyst preparation method such as an impregnation method, a coprecipitation method or a vapor deposition method. Above all, the impregnation method is more effective, and its operation is also simple.

One example of the impregnation method comprises impregnating the above-mentioned chromium oxide with a solution containing copper, an alkali metal and a rare earth metal, or a solution containing chromium, copper, an alkali metal and a rare earth metal, and then calcining it at a temperature of 800° C. or less.

In the method of the present invention, the use of the three components of copper, the alkali metal and the rare earth metal is essential, and if any of these components is omitted, the activity of the catalyst cannot be sufficiently improved, so that the objects of the present invention cannot be accomplished any more.

Typical examples of the chromium component which can be used in the present invention include water-soluble chromium salts such as chromium nitrate and chromium chloride as well as water-soluble chromium oxides such as anhydrous chromic acid. The concentration of the chromium salt or the chromium oxide is preferably in the range of 5 to 45%. A weight ratio of $Cr_2O_3$ to $SiO_2$ which are conformations in the case that the catalyst has been finally calcined, i.e., $Cr_2O_3/SiO_2$ is preferably set so as to be in the range of 5/95 to 95/5.

Typical examples of the copper component which can be used in the present invention include copper nitrate, copper sulfate, copper chloride and copper oxide, and examples of the alkali metal and the rare earth metal which can be used include nitrates, sulfates, chlorides and oxides of these metals. Typical examples of the alkali metal component include potassium nitrate, potassium sulfate, potassium chloride, sodium nitrate, sodium sulfate, sodium chloride and sodium oxide, and typical examples of the rare earth metal salt include nitrates, sulfates, halides and oxides of lanthanum, cerium, praseodymium, neodymium, promethium, samarium and europium, and above all, the salts of lanthanum are preferable.

When the concentrations of copper, the alkali metal and the rare earth metal are high, their larger effects can be obtained, but copper, potassium and lanthanum are preferably present in atomic ratios of 0.01 to 0.3, 0.005 to 0.2 and 0.01 to 0.3, respectively, with respect to chromium in the catalyst containing chromium oxide as the main component.

In the case that the carrier is impregnated with copper, the alkali metal and the rare earth metal in accordance with the present invention, no particular restriction is put on the impregnation method, but there can be used any impregnation method in which the impregnation of the solution containing the chromium component is done before that of the solution containing the copper, the alkali metal and the rare earth metal, an impregnation method in which the impregnation of the chromium component is done simultaneously with that of the other components, and an impregnation method in which the impregnation of the chromium component is done after that of the other components. Above all, it is preferable in many cases that the impregnation of the chromium component precedes that of the other components in accordance with the previous impregnation method.

In impregnating the carrier with the solution in which the above-mentioned components are dissolved, the temperature of the solution is preferably in the range of 25° to 70° C., more preferably 25° to 35° C. The amount of the solution is a factor important to accomplish the uniform impregnation, and it is preferably changed in compliance with the specific surface area of the catalyst. Typically, in the case of a specific surface area of 270 to 320 m²/g, the amount of the solution is preferably ½ to twice as much as the amount of the catalyst; in the case of a specific surface area of 200 to 270 m²/g, the amount of the solution is preferably ⅓ to ½ of the amount of the catalyst; and in the case of a specific surface area of 200 m²/g or less, the amount of the solution is preferably ⅓ or less of the amount of the catalyst. These requirements are most suitable for the uniform impregnation.

The impregnation treatment, if necessary, can be carried out dividedly several times without bringing about any problem of performance, but in such a case, it is required to repeat the impregnation and preliminary calcination (150° to 300° C.) several times. Nevertheless, it is preferred that the carrier is impregnated with a predetermined amount of the solution at a time. After the impregnation, a mixing operation can be carried out by shaking a vessel containing the catalyst and an aqueous solution or an organic solvent solution for about one hour so that all of the catalyst may be mixed, but in the case that the wet state of the catalyst is low, this shaking/mixing time is required to be prolonged several times. Afterward, the catalyst subjected to the mixing treatment is then calcined at a temperature of 800° C. or less. From the viewpoint of preventing the metal components in the impregnated carrier from volatilizing, the calcination temperature is preferably in the range of 300° to 650° C., more preferably 350° to 550° C.

As hydrogen chloride as a starting material which can be used in the preparation of chlorine in the presence of the catalyst regarding the present invention, there can be used hydrogen chloride obtained as a by-product by the chlorination of an organic compound or a reaction with phosgene in the field of chemical industry, which is economical. However, such supply of hydrogen chloride is not limited.

As an oxidizing agent for hydrogen chloride, an oxygen-containing gas can be used, and an oxygen gas or air is usually often used. With regard to the type of a reactor, a fixed bed and a fluidized bed are practicable, but the fluidized bed is often used, because the oxidation reaction of hydrogen chloride generates a large amount of heat and the fluidized bed can easily remove the heat. In the case of the fluidized bed type, the oxygen gas is often used, and in the case of the fixed bed type, air is often used.

A molar ratio between hydrogen chloride and oxygen in the oxygen-containing gas which can be used in the reaction is usually such that oxygen is ¼ mol (equivalent) with respect to 1 mol of hydrogen chloride. In general, oxygen is often used in an excess of 5 to 200% more than the equivalent. These material gases may be diluted with a gas such as nitrogen which is inert to the main reaction.

In the case of the fluidized bed type, hydrogen chloride can suitably be fed to the catalyst bed at a feed rate of 200 to 1800 Nl/hr/Kg-cat.

A reaction temperature is often preferably in the range of 300° to 450° C., more preferably 360° to 420° C.

The main reaction is practicable under either of atmospheric pressure and applied pressure, but in general, it is often preferably carried out under an applied pressure of 2 to 11 $kg/cm^2$ abs.

When a conventional known catalyst containing chromium oxide as a main component is used for a period of several months to half a year under the above-mentioned reaction conditions, its activity deteriorates, and an initial hydrogen chloride conversion of 70 to 80% decreases to 50 to 60%.

In the present invention, as a base catalyst containing chromium oxide as a main component, there can be utilized a used waste conventional known catalyst having a deteriorated activity which mainly comprises chromium oxide. By virtue of the present invention, such a waste catalyst can be impregnated with a solution containing copper, an alkali metal and a rare earth metal, or a solution containing chromium, copper, an alkali metal and a rare earth metal to recover the activity of the catalyst.

According to the present invention, there can be provided an improved catalyst for use in the reaction of preparing chlorine by the oxidation of hydrogen chloride, and the improved catalyst has a higher activity and the deterioration of the activity with time is smaller than a conventional catalyst. In addition, the improved catalyst can be obtained by a simple method. In the conventional chromium oxide catalyst, a large excess of oxygen is required for the maintenance of an oxidation reaction, but the improved catalyst of the present invention can be used under oxygen concentration conditions of ⅓ to ½ of an oxygen concentration in the conventional chromium oxide catalyst, and even when the improved catalyst is used for a long period of time under such conditions, the activity deterioration of the improved catalyst is small. The thus obtained improved catalyst of the present invention can maintain a performance of high activity for a long period of time even under low oxygen concentration conditions when the oxygen excess ratio is 50%. Furthermore, according to the present invention, a conventional catalyst mainly comprising chromium oxide and having the deteriorated activity which has been used for a long term in the oxidation reaction of hydrogen chloride can be activated and reactivated. The thus reactivated catalyst has high activity and can exhibit a performance equal to the fresh catalyst even when used for a long term.

Next, a method of the present invention will be described in more detail with reference to examples. Incidentally, a base catalyst containing chromium oxide as a main component (hereinafter referred to as "chromium oxide catalyst") was prepared by a method described in Japanese Patent Application Laid-open No. 275104/1986.

EXAMPLE 1

50 g of a fine spherical chromium oxide catalyst for a fluidized bed having an average particle diameter of 61 μm and consisting of 75% by weight of chromia and 25% by weight of silica was impregnated with 25 ml of an aqueous solution containing 6.71 g of $CuCl_2.2H_2O$, 2.85 g of KCl and 7.79 g of $La(NO_3)_3.6H_2O$, and the catalyst was then calcined at 510° C. for 5 hours. Next, 40 g of the thus treated catalyst was filled into a glass fluidized bed reactor having an internal diameter of 1 inch, and a hydrogen chloride gas and oxygen were introduced into the fluidized bed at feed rates of 334 ml/min and 125 ml/min (oxygen excess ratio= about 50%), respectively. Afterward, the outside of the reaction tube was heated by an electric furnace so that the inside temperature of the reaction tube might be 380° C., to carry out the reaction.

On the second day from the reaction start, the conversion of hydrogen chloride was 78%. On the 30th day from the reaction start, the conversion was 76%, and even on the 60th day, the conversion was 74%, which was indicative that a high activity was maintained.

EXAMPLE 2

In accordance with all the same procedures as in Example 1, 50 g of a fine spherical chromium oxide catalyst for a fluidized bed having an average particle diameter of 50 μm and consisting of 75% by weight of chromia and 25% by weight of silica was impregnated with 55 ml of an aqueous solution containing 12.72 g of $Cu(NO_3)_2.3H_2O$, 5.19 g of $KNO_3$ and 10.42 g of $La(NO_3)_3.6H_2O$, and the catalyst was then calcined at 550° C. for 5 hours. Next, 40 g of the thus treated catalyst was used in the oxidation reaction of hydrogen chloride by all the same procedures as in Example 1.

On the third day from the reaction start, the conversion of hydrogen chloride was 80%, and the conversion on the 10th day was 80%. On the 30th day from the reaction start, the conversion was 77% and on the 65th day, it was 76%, which was indicative that the activity and life of the catalyst were about the same as in Example 1.

EXAMPLE 3

4 kg of a fine spherical chromium oxide catalyst for a fluidized bed having an average particle diameter of 73 μm and consisting of 70% by weight of chromia and 30% by weight of silica was impregnated with 5.5 liters of an aqueous solution containing 1825.7 g of $Cu(NO_3)_2.3H_2O$, 548.8 g of KCl and 1496.3 g of $La(NO_3)_3.6H_2O$, and the catalyst was then calcined at 550° C. for 5 hours. Next, 4 kg of the thus treated catalyst was filled into a nickel fluidized bed reactor having an internal diameter of 4 inches, and its outside was then heated up to 400° C. on a sand fluidized bath. Afterward, a hydrogen chloride gas and oxygen were introduced into the fluidized bed at feed rates of 1400 Nl/hr and 525 Nl/hr (oxygen excess ratio=about 50%), respectively, to carry out the reaction.

On the third day from the reaction start, the conversion of hydrogen chloride was 81%, and the conversion on the 30th day was 78%. On the 67th day from the reaction start, the conversion was 77%, which was indicative that the deterioration of activity was extremely small.

COMPARATIVE EXAMPLES 1 TO 3

The use of three components of copper, an alkali metal and a rare earth metal is essential for a catalyst containing chromium oxide as a main component, but when any one of these components was omitted as described below, the activity of the catalyst was very low. The results are shown in Table 1.

TABLE 1

| | Components for Impregnation | | Conversion (after 3 days) |
|---|---|---|---|
| Comp. Ex. 1 | .No copper component .KCl .La(NO$_3$)$_3$.3H$_2$O | 4.72 g 12.48 g | 15.1% |
| Comp. Ex. 2 | .Cu(NO$_3$)$_2$.3H$_2$O .No alkali metal component .La(NO$_3$)$_3$.6H$_2$O | 10.72 g 12.48 g | Aggregated |
| Comp. Ex. 3 | .Cu(NO$_3$)$_2$.3H$_2$O .KCl .No rare earth metal component | 10.72 g 4.72 g | 29.0% |

Reaction Conditions

Device for reaction: Glass fluidized bed reactor having an internal diameter of 1 inch Amount of catalyst for reaction: 40 g Feed rate of waste hydrogen chloride gas: 334 ml/min Feed rate of oxygen: 167 ml/min (oxygen excess ratio =about 100%)

Reaction temperature: Heating to an inside temperature of 380° C. by an electric furnace Base catalyst used in impregnation treatment: The same chromium oxide catalyst as used in Example 1

COMPARATIVE EXAMPLES 4 AND 5

It was confirmed that conventional Deacon catalysts had problems of activity deterioration and aggregation. The results are shown in Table 2.

TABLE 2

| | Catalyst Composition | | Reaction Results |
|---|---|---|---|
| Comp. Ex. 4 | SiO$_2$ Cu(NO$_3$)$_2$.3H$_2$O KCl La(NO$_3$)$_3$.6H$_2$O | 15.0 g 10.72 g 4.72 g 6.24 g | After 30 days, the catalyst aggregated, and fluidizing stopped. After 3 days, conversion decreased from 77% to 45%. |
| Comp. Ex. 5 | SiO$_2$ Cu(NO$_3$)$_2$.3H$_2$O | 15.0 g 5.36 g | After 19 days, the catalyst aggregated, and fluidizing |

TABLE 2-continued

| Catalyst Composition | Reaction Results |
|---|---|
| KCl<br>La(NO$_3$)$_3$.6H$_2$O | 2.36 g stopped. After 3 days,<br>6.24 g conversion decreased from 74% to 40%. |

Reaction Conditions

Device for reaction: Glass fluidized bed reactor having an internal diameter of 1 inch Amount of catalyst for reaction: 20 g Feed rate of hydrogen chloride gas: 167 ml/min Feed rate of oxygen: 84 ml/min (oxygen excess ratio =about 100%)

Reaction temperature: Heating to an inside temperature of 380° C. by an electric furnace Medium used in impregnation treatment: Silica gel CARi-ACT made by Fuji Silicia Chemical Co., Ltd.

EXAMPLE 4

40 g of a fine spherical chromium oxide catalyst for a fluidized bed having an average particle diameter of 60 μm and consisting of 75% by weight of chromia and 25% by weight of silica was filled into a glass fluidized bed reactor having an internal diameter of 1 inch. Next, a hydrogen chloride gas and oxygen were introduced into the fluidized bed at feed rates of 334 ml/min and 167 ml/min (oxygen excess ratio=about 100%), respectively, and the outside of the reaction tube was then heated by an electric furnace so that the inside temperature of the reaction tube might be 380° C., to carry out reaction.

On the third day from the reaction start, the conversion of hydrogen chloride was 73%. On the 30th day from the reaction start, the conversion was 67%, and on the 65th day, the conversion decreased to 55%. At this time, the used catalyst was taken out, and then impregnated with 50 ml of an aqueous solution containing 10.72 g of CuCl$_2$.2H$_2$O, 4.72 g of KCl and 12.48 g of La(NO$_3$)$_2$.3H$_2$O(NO$_3$)$_3$.6H$_2$O, and the catalyst was then calcined at 510° C. for 5 hours. Next, 40 g of the thus reactivated catalyst was subjected to reaction in the same manner as described above. On the third day from the reaction start, the conversion of hydrogen chloride was 77%, and the conversion on the 10th day was 72%. On the 30th day from the reaction start, the conversion was 68%, and the conversion on the 65th day was 58%, which was indicative that the activity and life of the reactivated catalyst were the same as in a fresh catalyst.

EXAMPLE 5

A used catalyst having a low activity which had been used for 65 days by all the same procedures as in Example 4 was impregnated with 40 ml of a solution prepared by adding 7.2 g of CuCl$_2$.2H$_2$O and 4.27 g of KNO$_3$ to 15 ml of a 25% aqueous nitric acid solution containing 3.14 g of La$_2$O$_3$, and the catalyst was then calcined at 550° C. for 5 hours. Afterward, 40 g of this reactivated catalyst was used in the oxidation reaction of hydrogen chloride by all the same procedures as in Example 4.

On the third day from the reaction start, the conversion of hydrogen chloride was 74%, and the conversion on the 10th day was 71%. On the 30th day from the reaction start, the conversion was 65%, and the conversion on the 65th day was 57%, which was indicative that the activity and life of the reactivated catalyst were about the same as in Example 4.

EXAMPLE 6

A used catalyst having a low activity which had been used for 65 days by all the same procedures as in Example 4 was impregnated with 40 ml of a solution containing 9.51 g of Cu(NO$_3$)$_2$.3H$_2$O, 3.87 g of KNO$_3$ and 7.79 g of La$_2$(NO$_3$)$_3$.6H$_2$O, and the catalyst was then calcined at 550° C. for 5 hours. Afterward, 40 g of this reactivated catalyst was used in the oxidation reaction of hydrogen chloride by all the same procedure as in Example 4. On the fifth day from the reaction start, the conversion of hydrogen chloride was 74%, and the conversion on the 10th day was 72%. On the 30th day from the reaction start, the conversion was 64%, and the conversion on the 66th day was 59%, which was indicative that the activity and life of the reactivated catalyst were about the same as in Example 4.

EXAMPLE 7

4 kg of a fine spherical chromium oxide catalyst for a fluidized bed having an average particle diameter of 63 μm and consisting of 70% by weight of chromia and 30% by weight of silica was filled into a nickel fluidized bed reactor having an internal diameter of 4 inches, and its outside was then heated up to 400° C. on a sand fluidized bath. Next, a waste hydrogen chloride gas and an oxygen gas were introduced into the fluidized bed at feed rates of 1400 Nl/hr and 1000 Nl/hr, respectively, to carry out reaction.

On the third day from the reaction start, the conversion of hydrogen chloride was 78%, and the conversion on the 30th day was 75%. On the 76th day from the reaction start, the conversion decreased to 63%. At this time, the used catalyst was taken out, and then impregnated with 5 liters of an aqueous solution containing 1.072 kg of CuCl$_2$.2H$_2$O, 0.472 kg of KCl and 1.248 kg of La(NO$_2$)$_3$.6H$_2$O, and the catalyst was then calcined at 510° C. for 5 hours. Next, 4 kg of the thus reactivated catalyst was subjected to reaction in the same manner as described above.

On the third day from the reaction start, the conversion of hydrogen chloride was 79%, and the conversion on the 30th day was 74%. On the 66th day from the reaction start, the conversion was 63%, which was indicative that the activity and life of the reactivated catalyst were the same as in a fresh catalyst.

COMPARATIVE EXAMPLES 6 TO 8

The use of three components of copper, an alkali metal and a rare earth metal is essential for a catalyst containing chromium oxide as a main component, but when any one of these components was omitted as described below, the reactivation of the catalyst was impossible. The results are shown in Table 3.

TABLE 3

| | Components for Impregnation | | Conversion (after 3 days) |
|---|---|---|---|
| Comp. Ex. 6 | .No copper component | | |
| | .KCl | 4.72g | 13.6% |
| | .La(NO$_3$)$_3$.6H$_2$O | 12.48 g | |
| Comp. Ex. 7 | .Cu(NO$_3$)$_2$.2H$_2$O | 10.72 g | |
| | .No alkali metal component | | Aggregated |
| | .La(NO$_3$)$_3$.6H$_2$O | 12.48 g | |

TABLE 3-continued

| | Components for Impregnation | | Conversion (after 3 days) |
|---|---|---|---|
| Comp. Ex. 8 | .Cu(NO$_3$)$_2$.2H$_2$O<br>.KCl<br>.No rare earth metal component | 10.72 g<br>4.72g | 27.1% |

Reaction Conditions

Device for reaction: Glass fluidized bed reactor having an internal diameter of 1 inch Amount of catalyst for reaction: 40 g Feed rate of hydrogen chloride gas: 334 ml/min Feed rate of oxygen: 167 ml/min (oxygen excess ratio =about 100%)

Reaction temperature: Heating to an inside temperature of 380° C. by an electric furnace Base catalyst used in impregnation treatment:

Chromium oxide catalyst in which conversion on 65th day from reaction start decreased to 58% in Example 4

EXAMPLE 8

40 g of a fine spherical chromium oxide catalyst for a fluidized bed having an average particle diameter of 60 μm and consisting of 75% by weight of chromia and 25% by weight of silica was filled into a glass fluidized bed reactor having an internal diameter of 1 inch. Next, hydrogen chloride gas and oxygen were introduced into the fluidized bed at feed rates of 334 ml/min and 167 ml/min, respectively, and the outside of the reaction tube was then heated by an electric furnace so that the inside temperature of the reaction tube might be 380° C. A molar ratio of oxygen/hydrogen chloride was ½, and an oxygen excess ratio was 100%.

On the third day from the reaction start, the conversion of hydrogen chloride was 73%. The conversion on the 30th day was 67%, and on the 65th day, it decreased to 55%.

Thus used catalyst having the decreased activity was impregnated with 8.3 ml of an aqueous solution containing 15.3 kg of Cr(NO$_3$)$_3$.9H$_2$O, and it was then calcined at 520° C. for 6 hours. Afterward, the catalyst was impregnated with 50 ml of an aqueous solution containing 10.72 g of CuCl$_2$.2H$_2$O, 4.72 g of KCl and 12.48 g of La(NO$_3$)$_3$.6H$_2$O, and the thus treated catalyst was then calcined at 510° C. for 5 hours. Next, 40 g of the thus reactivated catalyst was subjected to reaction in the same manner as described above.

On the third day from the reaction start, the conversion of hydrogen chloride was 77%, and the conversion on the 10th day was 72%. On the 30th day from the reaction start, the conversion was 68%, and the conversion on the 65th day was 65%, which was indicative that the activity and life of the reactivated catalyst were equal to or more excellent than those of a fresh catalyst.

COMPARATIVE EXAMPLE 9

40 g of a fine spherical chromium oxide catalyst for a fluidized bed having an average particle diameter of 60 μm and consisting of 75% by weight of chromia and 25% by weight of silica was filled into a glass fluidized bed reactor having an internal diameter of 1 inch. Next, hydrogen chloride gas and oxygen were introduced into the fluidized bed at feed rates of 334 ml/min and 125 ml/min, respectively, and the outside of the reaction tube was then heated by an electric furnace so that the inside temperature of the reaction tube might be 380° C. A molar ratio of oxygen/hydrogen chloride was ⅜, and an oxygen excess ratio was 50%.

On the third day from the reaction start, the conversion of hydrogen chloride was 63%. The conversion on the 30th day from the reaction start was 57%, and on the 65th day, it decreased to 45%.

EXAMPLE 9

40 g of a fine spherical chromium oxide catalyst for a fluidized bed having an average particle diameter of 60 μm and consisting of 75% by weight of chromia and 25% by weight of silica was filled into a glass fluidized bed reactor having an internal diameter of 1 inch. Next, a waste hydrogen chloride gas and oxygen were introduced into the fluidized bed at feed rates of 334 ml/min and 125 ml/min, respectively, and the outside of the reaction tube was then heated by an electric furnace so that the inside temperature of the reaction tube might be 380° C. A molar ratio of oxygen/hydrogen chloride was ⅜, and an oxygen excess ratio was 50%.

On the third day from the reaction start, the conversion of hydrogen chloride was 63%. The conversion on the 30th day from the reaction start was 57%, and on the 65th day, it decreased to 45%. At this time, the used catalyst was taken out, impregnated with 8.3 ml of an aqueous solution containing 15.3 g of Cr(NO$_3$)$_3$.9H$_2$O, calcined at 520° C. for 6 hours, impregnated with 50 ml of an aqueous solution containing 10.72 g of CuCl$_2$.2H$_2$O, 4.72 g of KCl and 12.48 g of La(NO$_3$)$_3$.6H$_2$O, and then calcined at 510° C. for 5 hours. Next, 40 g of the thus reactivated catalyst was subjected to reaction in the same manner as described above.

On the third day from the reaction start, the conversion of hydrogen chloride was 77%, and the conversion on the 10th day was 72%. The conversion on the 30th day from the reaction start was 68%, and the conversion on the 65th day was 65%, which was indicative that the activity and life of the reactivated catalyst were equal to or more excellent than those of a fresh catalyst.

EXAMPLE 10

40 g of a fine spherical chromium oxide catalyst for a fluidized bed having an average particle diameter of 60 μm and consisting of 75% by weight of chromia and 25% by weight of silica was filled into a glass fluidized bed reactor having an internal diameter of 1 inch. Next, the catalyst was subjected to reaction in the same manner as in Example 7, and the thus used catalyst was taken out, simultaneously impregnated with 8.3 ml of an aqueous solution containing 15.3 g of Cr(NO$_3$)$_3$.9H$_2$O and 50 ml of an aqueous solution containing 10.72 g of CuCl$_2$.2H$_2$O, 4.72 g of KCl and 12.48 g of La(NO$_3$)$_3$.6H$_2$O, and then calcined at 510° C. for 5 hours. Next, 40 g of the thus reactivated catalyst was subjected to reaction in the same manner as described above.

On the third day from the reaction start, the conversion of hydrogen chloride was 77%, and the conversion on the 10th day was 72%. The conversion on the 30th day from the reaction start was 68%, and the conversion on the 65th day was 65%, which was indicative that the activity and life of the reactivated catalyst were equal to or more excellent than those of a fresh catalyst.

EXAMPLE 11

40 g of a fine spherical chromium oxide catalyst for a fluidized bed having an average particle diameter of 60 μm and consisting of 75% by weight of chromia and 25% by weight of silica was filled into a glass fluidized bed reactor having an internal diameter of 1 inch. Next, the catalyst was subjected to reaction in the same manner as in Example 7, and the thus used catalyst was taken out, impregnated with 8.3 ml of an aqueous solution containing 20.3 g of $Cr(NO_3)_3 \cdot 9H_2O$, calcined at 500° C. for 7 hours, impregnated with 50 ml of an aqueous solution containing 13.72 g of $CuCl_2 \cdot 2H_2O$, 5.72 g of KCl and 14.28 g of $La(NO_3)_3 \cdot 6H_2O$, and then calcined at 510° C. for 5 hours. Next, 40 g of the thus reactivated catalyst was subjected to reaction in the same manner as described above.

On the third day from the reaction start, the conversion of hydrogen chloride was 77%, and the conversion on the 10th day was 72%. The conversion on the 30th day from the reaction start was 69%, and the conversion on the 65th day was 66%, which was indicative that the activity and life of the reactivated catalyst were equal to or more excellent than those of a fresh catalyst.

EXAMPLE 12

In accordance with the same procedure as in Example 1 except that 2.85 g of KCl was replaced with 2.23 g of NaCl, a chromium oxide catalyst was impregnated with components of copper, an alkali metal and a rare earth metal to prepare an improved catalyst, and hydrogen chloride was then reacted with oxygen in the presence of the thus prepared catalyst under the same conditions as in Example 1.

On the second day from the reaction start, the conversion of hydrogen chloride was 75%, and the conversion on the 30th day was 72%, and on the 60th day, it was 70%.

EXAMPLE 13

In accordance with the same procedure as in Example 1 except that 7.79 g of $La(NO_3)_3 \cdot 6H_2O$ was replaced with 7.89 g of $Nd(NO_3)_3 \cdot 6H_2O$, a chromium oxide catalyst was impregnated with components of copper, an alkali metal and a rare earth metal to prepare an improved catalyst, and hydrogen chloride was then reacted with oxygen in the presence of the thus prepared catalyst under the same conditions as in Example 1.

On the second day from the reaction start, the conversion of hydrogen chloride was 77%, and the conversion on the 30th day was 75%, and on the 60th day, it was 74%.

What is claimed is:

1. A catalyst for the preparation of chlorine by oxidizing hydrogen chloride with an oxygen-containing gas which is obtained by adding copper, an alkali metal and a rare earth metal, or adding chromium, copper, an alkali metal and a rare earth metal to a catalyst containing chromium oxide as a main component that is obtained by calcining, at a temperature of 800° C. or less, a mixture comprising a silicon compound and a reaction product of a chromium salt and ammonia or a compound capable of releasing ammonia.

2. The catalyst according to claim 1 wherein the catalyst containing chromium oxide as the main component is a catalyst having a deteriorated activity which has already been used as the catalyst for the preparation of chlorine by oxidizing hydrogen chloride.

3. The catalyst according to claim 1 wherein the alkali metal is potassium.

4. The catalyst according to claim 1 wherein the rare earth metal is lanthanum.

5. The catalyst according to claim 1 wherein copper, potassium and lanthanum are present in atomic ratios of 0.01 to 0.3, 0.005 to 0.2 and 0.01 to 0.3, respectively, with respect to chromium in the catalyst containing chromium oxide as the main component.

6. The catalyst according to claim 1 wherein after the calcination, a silicon compound is present in the form of silicon dioxide, and a weight ratio of chromium oxide to silicon dioxide is in the range of 5/95 to 95/5.

7. A method for preparing a catalyst for the preparation of chlorine from hydrogen chloride by oxidizing hydrogen chloride with an oxygen-containing gas which comprises a step of impregnating a catalyst containing chromium oxide as a main component that is obtained by calcining, at a temperature of 800° C. or less, a mixture comprising a silicon compound and a reaction product of a chromium salt and ammonia or a compound capable of releasing ammonia, said step of impregnating being with a solution containing copper, an alkali metal and a rare earth metal, or a solution containing chromium, copper, an alkali metal and a rare earth metal, and a step of calcining the impregnated catalyst at a temperature of 800° C. or less.

8. The method for preparing a catalyst according to claim 7 wherein the catalyst containing chromium oxide as the main component is impregnated with 0.2 to 2 ml of the solution for the impregnation with respect to 1 g of the catalyst containing chromium oxide as the main component.

9. A method for preparing chlorine comprising the step of oxidizing hydrogen chloride with an oxygen-containing gas in the presence of a catalyst obtained by adding copper, an alkali metal and a rare earth metal, or adding chromium, copper, an alkali metal and a rare earth metal to a catalyst containing chromium oxide as a main component that is obtained by calcining, at a temperature of 800° C. or less, a mixture comprising a silicon compound and a reaction product of a chromium salt and ammonia or a compound capable of releasing ammonia.

10. The method for preparing chlorine according to claim 9 wherein hydrogen chloride is reacted with oxygen in an oxygen-containing gas, a molar ratio of oxygen being in the range ¼ to 1 with respect to 1 mol of hydrogen chloride.

* * * * *